Aug. 15, 1972   R. C. GESCHWENDER   3,684,618
FABRICATION OF HONEYCOMB TYPE CELLULAR MATERIALS
Filed May 27, 1970   12 Sheets-Sheet 2

Aug. 15, 1972  R. C. GESCHWENDER  3,684,618
FABRICATION OF HONEYCOMB TYPE CELLULAR MATERIALS
Filed May 27, 1970  12 Sheets-Sheet 1

FIG.I.

Robert C. Geschwender,
Inventor.
Koenig, Senniger, Powers and Leavitt,
Attorneys.

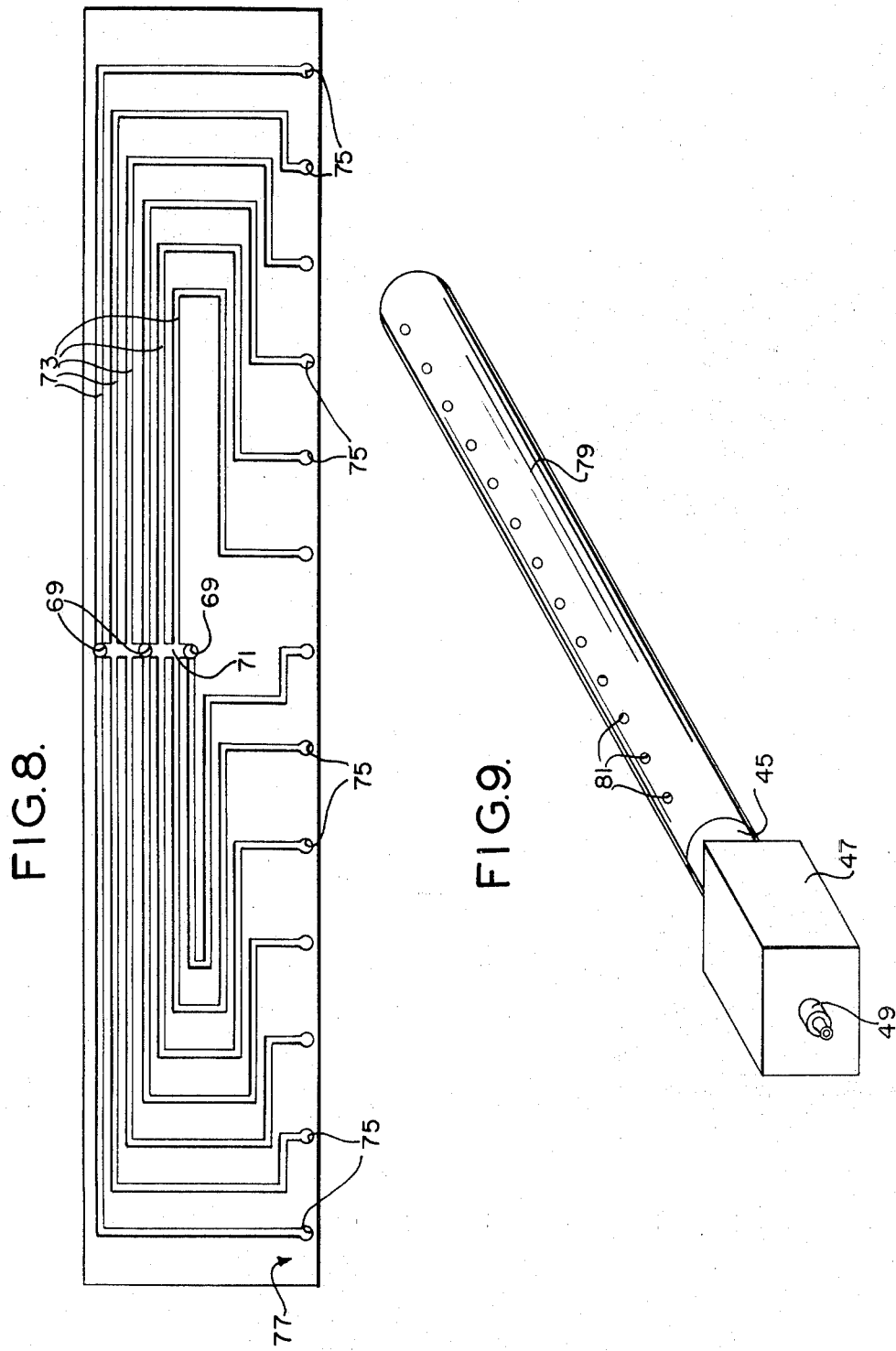

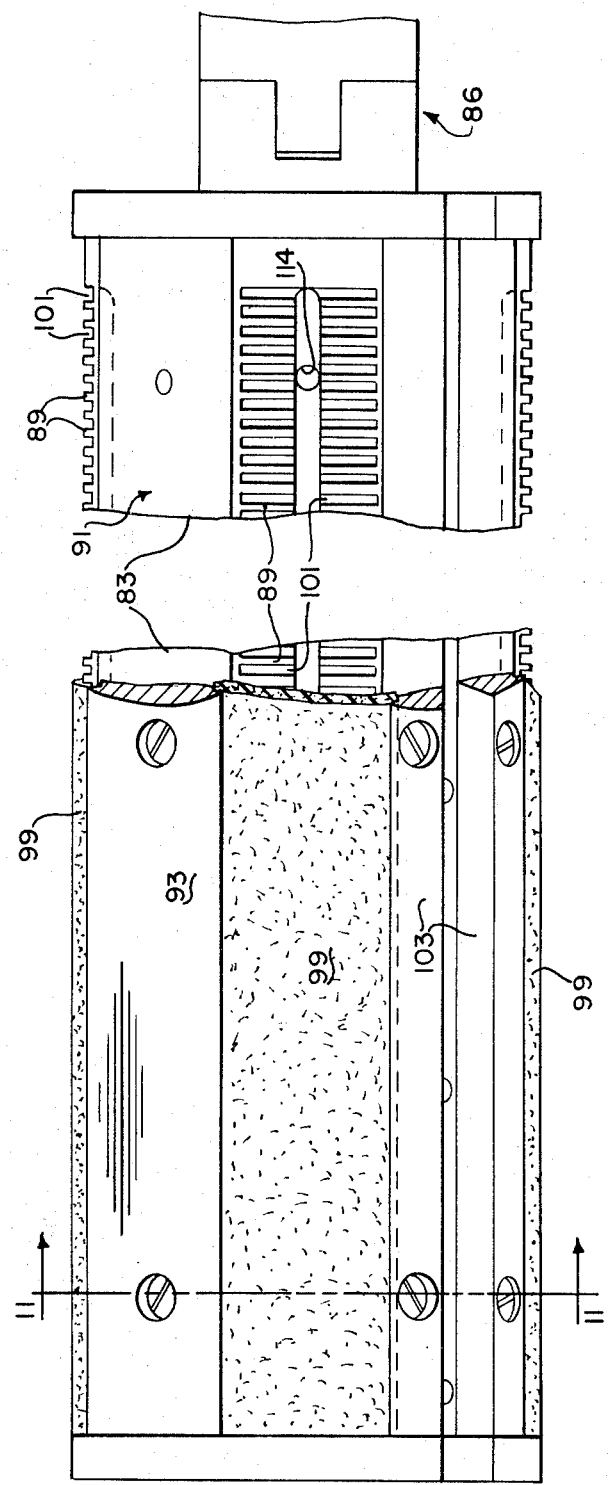

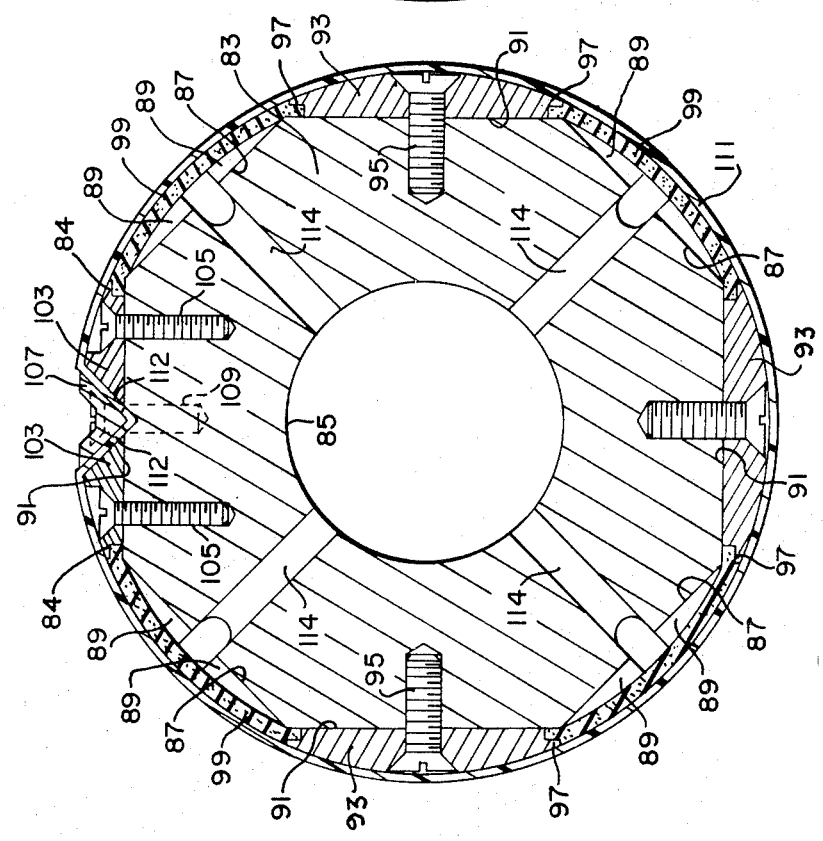

Aug. 15, 1972   R. C. GESCHWENDER   3,684,618
FABRICATION OF HONEYCOMB TYPE CELLULAR MATERIALS
Filed May 27, 1970   12 Sheets-Sheet 9

Aug. 15, 1972   R. C. GESCHWENDER   3,684,618
FABRICATION OF HONEYCOMB TYPE CELLULAR MATERIALS
Filed May 27, 1970   12 Sheets-Sheet 10

United States Patent Office 3,684,618
Patented Aug. 15, 1972

---

3,684,618
FABRICATION OF HONEYCOMB TYPE CELLULAR MATERIALS
Robert C. Geschwender, 1800 Center Park Road, Lincoln, Nebr. 68108
Continuation-in-part of application Ser. No. 652,555, July 11, 1967. This application May 27, 1970, Ser. No. 40,750
Int. Cl. B32b 31/08, 31/18, 31/20
U.S. Cl. 156—361
13 Claims

ABSTRACT OF THE DISCLOSURE

A strip of suitable material, such as treated kraft paper, metal foil or the like is drawn between rolls of a slitter, so designed that by means of a very simple adjustment the finished product may have a selected one of a number of sizes and angles of honeycomb type cells. After slitting, the strip passes through an adhesive applicator having outlets to imprint staggered areas of adhesive on opposite sides of the strip between rows of slits. The applicator is constructed to prevent access of air to the adhesive during its travel from a supply to the imprinting region thus preventing premature setting of the adhesive and clogging of moving parts. Next the slitted strip with applied adhesive passes between substantially spaced folding wheels which will accept strips of various thicknesses for pleating and designed to minimize smearing of the adhesive. As the strip passes through the folding wheels the adhesive spacedly joins adjacent pleats. After the pleated material leaves the pleating wheels it is sent to braking apparatus which forms a uniform and leveled compaction wherein the adhesive sets. Then the material is drawn from the compaction by pulling apparatus to stretch it, thereby forming the honeycomb type cells. As the cellular web is pulled its width becomes less. Width-sensing means provides a signal indicating any deviation from the desired width. This signal is applied to means for controlling the speed of operation of the pulling apparatus to compensate for any incipient deviation from the desired width.

CROSS-REFERENCE TO RELATED APPLICATION

This application is a continuation-in-part of my copending application, Ser. No. 652,555, now U.S. Pat. No. 3,528,334, filed July 11, 1967.

BACKGROUND OF THE INVENTION

This application relates to my improvements upon structures such as shown in my U.S. Pat. No. 3,218,217, dated Nov. 16, 1965.

The general field is that of slitting, application of adhesive and pleating or strip material followed by stretching to produce honeycomb or like cellular bands. Several prior-art difficulties have occurred as follows:

(1) Substantially only one thickness of strip could be accepted and successfully operated upon by a machine or at least the range was exceedingly small. The present invention provides for a wider range.

(2) The slitter on a given machine would produce only one arrangement of slits with the result that only one honeycomb cell size and direction could be produced. Generally this direction was perpendicular to the opposite planes of the faces of the cellular product. By means of the present invention, on a given machine and by means of a simple adjustment, there can be obtained various sizes of honeycomb cells and various dispositions of their axes with respect to the faces of the product.

(3) Other difficulties have been the exposure to air of the adhesive and unequal distances in its travel to points of application. The exposure to air caused setting of the usually quick setting adhesive in and on the machine parts and required excessive down times for cleaning. The unequal distances caused uneven flow and application of adhesive to various areas. The invention avoids these difficulties by protecting the adhesive in the machine parts from access to air and for equal distances of flow.

(4) Trouble has also been encountered in stretching compacted pleated material in that it was difficult to maintain a substantially constant width when stretched. According to the present invention maintenance of such a substantially constant width is accomplished.

SUMMARY

A cutter roll is provided with axially extending continuous blades which contact the cylindrical surface of a recessed backing roll. The recesses determine where the blades will not cut and are arranged in groups which are different from one another. Different groups provide for different cell sizes and their angles. By providing for change in the phasing of the rotations of the cutter and backing rolls changes may be made in the cell size and angle in the finished product.

The adhesive applicator is provided with a pair of sealed, veined and ported manifolds such that all adhesive paths from a supply point to outlet ports are substantially equal and protected from air. Around each manifold is a ported Teflon or like bearing for a rotating applicator cylinder. The cylinder has ports for timed registration with the bearing ports. The outlets of these ports are covered by pervious mats of material through which the adhesive bleeds from the cylinder outlets. The entire cylinder is wrapped with an impervious fiberglass, or like jacket forming a dam which is perforated according to the design of the areas of adhesive desired to be placed on the slitted strip. Any one of variously ported jackets may be used. This jacket protects the adhesive within the cylinder and in the mats against contact by the air and its geometry of porting determines the shapes of the adhesive imprints on the slitted strip.

Pleating is brought about by interdigitating star wheels having lobes with wide enough clearances between them for receiving strips of any of a large range of thicknesses. These do not drive one another but are carried on shafts which are driven by interdigitating star-shaped drive wheels which have no such clearances. An intermittent drive for the drive wheels brings about proper angular motions of the folding star wheels.

As regards the system for obtaining a constant width of the cellular product in the form of a band, uniformly compacted and leveled material is stretched out by motorized draw rolls to expand the cells. This inherently reduces the width of the pleated material as a function of withdrawal speed. Width sensing means operative on the edges of the drawn-out material provide electrical signals responsive to any incipient deviation from a desired width. Such signals through conventional circuitry control motor current so that when too narrow a band width is detected the draw rolls are decelerated and when too wide the draw rolls are accelerated.

BRIEF DESCRIPTION OF THE DRAWINGS

FIG. 1 is a three-dimensional diagrammatic view of apparatus embodying the invention;

FIG. 8 is a development of the veined cylindrical surface of the manifold;

FIG. 9 is a view like FIG. 7 but showing a port-forming sleeve on the manifold, said sleeve forming a bearing for one of an applicator roll;

FIG. 10 is a side view of an adhesive applicator roll to be rotatably carried on said sleeve;

FIG. 11 is a cross section taken on line 11—11 of FIG. 10;

FIG. 12 is a right-end view of the rolls of FIGS. 10 and 11;

Corresponding reference characters indicate corresponding parts throughout the several views of the drawings. Various drawing scales have been used in the various figures as appeared best for clarity in exposition. Various conventional drive means are shown schematically.

DESCRIPTION OF THE PREFERRED EMBODIMENTS

Figure 2:
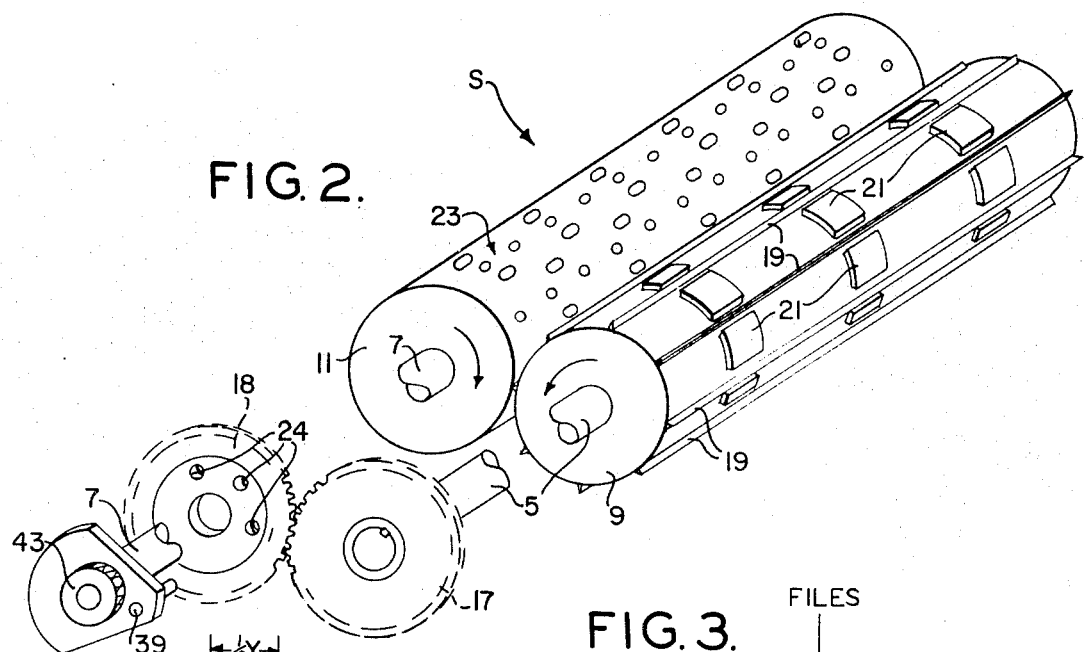
FIG. 2 is a view illustrating a pair of cutting and backing rolls of a slitting section of the apparatus.

Referring to FIG. 1, a suitable framework, part of which is shown at numeral 1, supports various operating sections of the apparatus, which are as follows: A slitting section S; an adhesive applicator section A; a folding and pleating section P; a turning section T; a braking and compacting section B; and a stretching and finishing section F.

At numeral 3 is shown a strip of suitable material such as kraft paper, metal foil or the like, capable of being slitted, and folded for pleating purposes. The strip 3 shall have been previously processed for strength, resistance to deterioration, etc., in the uses to which the final honeycomb product is to be put.

The strip 3 moves in the direction (see the dart thereon) from a suitable supply at the left and then down into the slitting section S. Rotatably mounted in the slitting section S on shafts 5 and 7 are slitting and backing rolls 9 and 11 respectively. Shaft 5 and therefore the slitting roll 9 are powered from a gear reduction unit 13 driven by a motor 15. Shaft 7 is driven from shaft 5 through meshed gears 17 and 18. This drives roll 11 oppositely and approximately tangently to roll 9.

Figure 3:
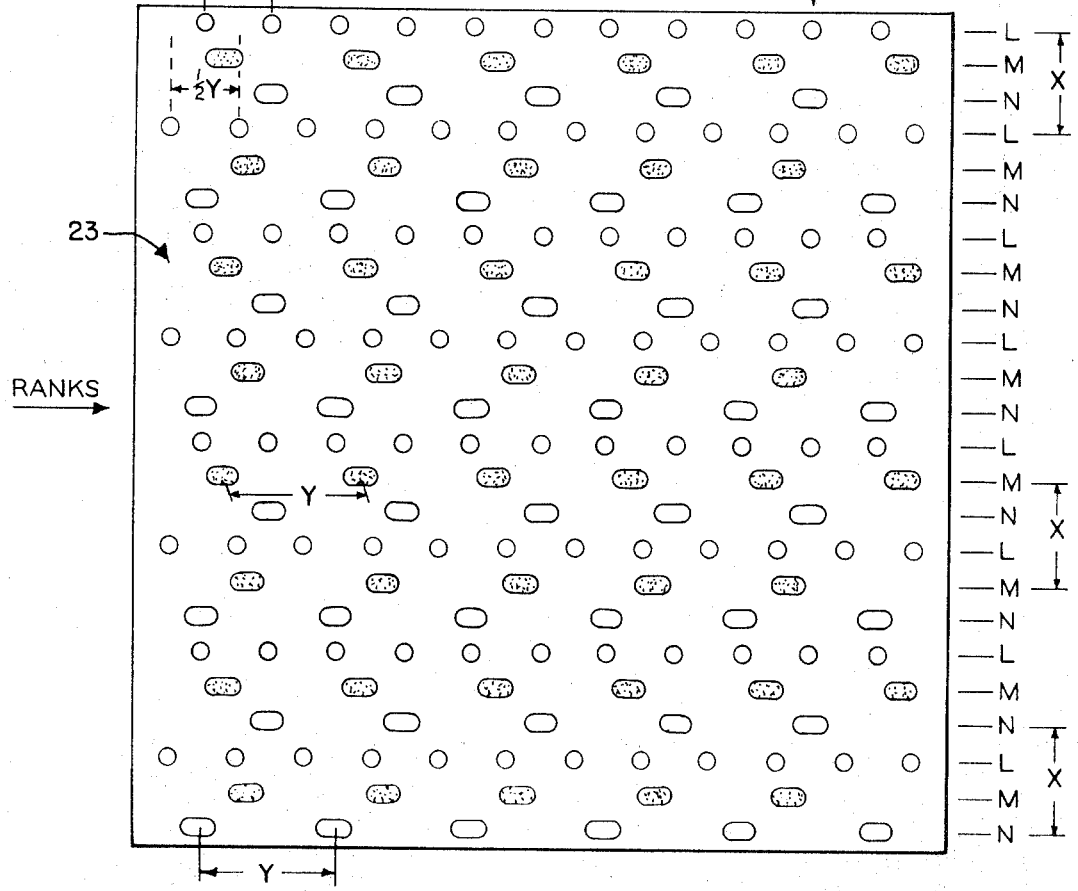
FIG. 3 is a developed view of the surface of the recessed backing roll.
Figure 4:
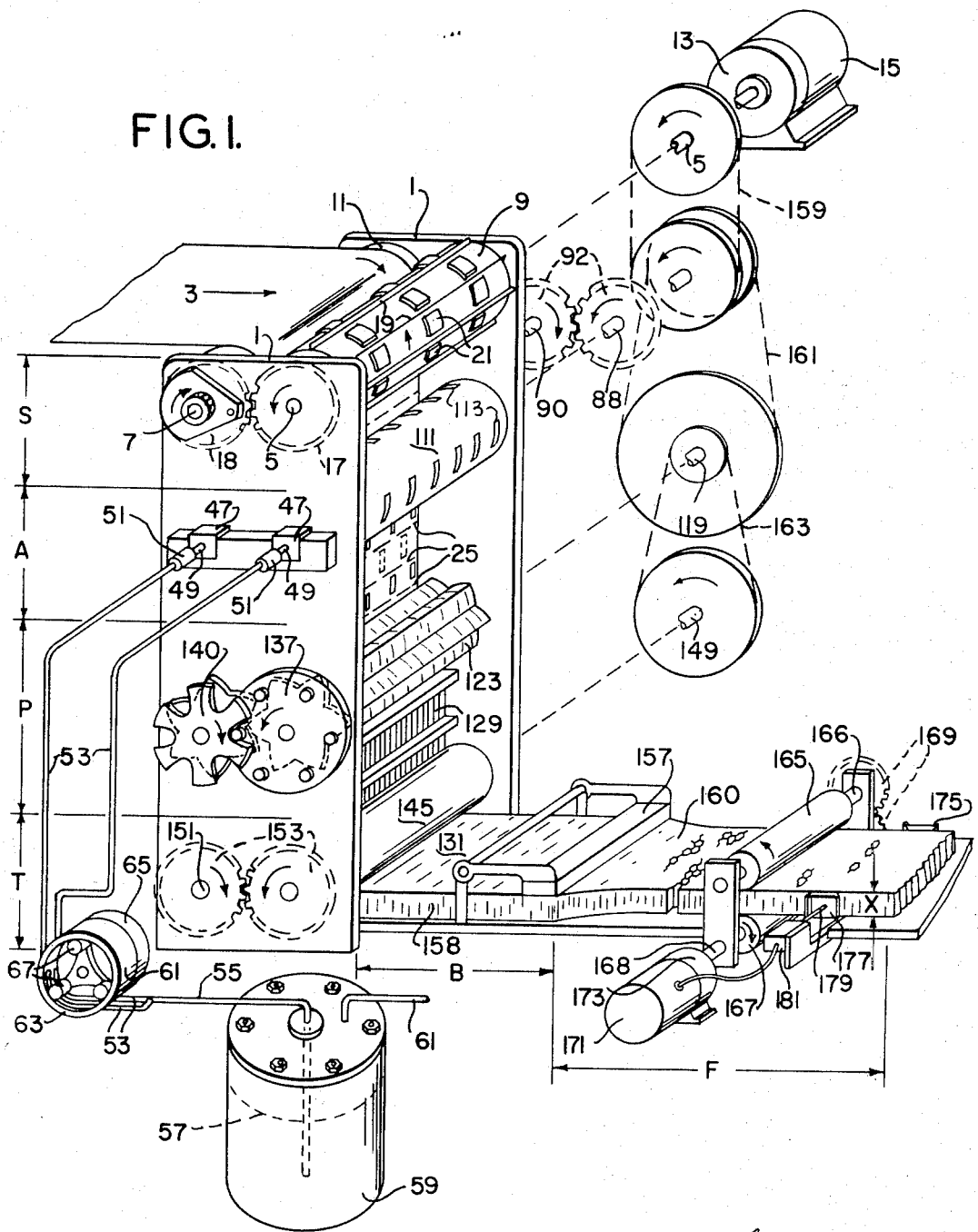
FIG. 4 is a diagrammatic view of details of a phase angle adjuster for use between the cutting and backing rolls.

Further details of the slitting and backing rolls 9 and 11 are shown in FIGS. 2–4. Appropriately anchored in axial slots and spaced at 45° intervals around the surface of the roll 9 are eight cutting blades 19. The cutting edge of each blade is substantially continuous and extends parallel to the axis of the roll 9. These edges move tangently into kissing engagement with the surface 23 of roll 11. In the spaces between the blades 19 are located resilient pads 21, the outer surfaces of which are located slightly beyond the cutting edges of the blades 19. These squeeze into tangent engagement with roll 11 to draw down the strip 3 as it enters section S over roll 11. The backing roll 11 is provided with recesses of various shapes and distribution. Thus they are in axial ranks to be bridged by the blades 19 when the rolls 9 and 11 turn oppositely. Wherever a blade bridges a recess no cutting action occurs. Between recesses in a given rank of recesses tangential action of the blades against the surface of the roll 11 produces ranks of spaced slits transversely to the length of strip S.

Figure 17:
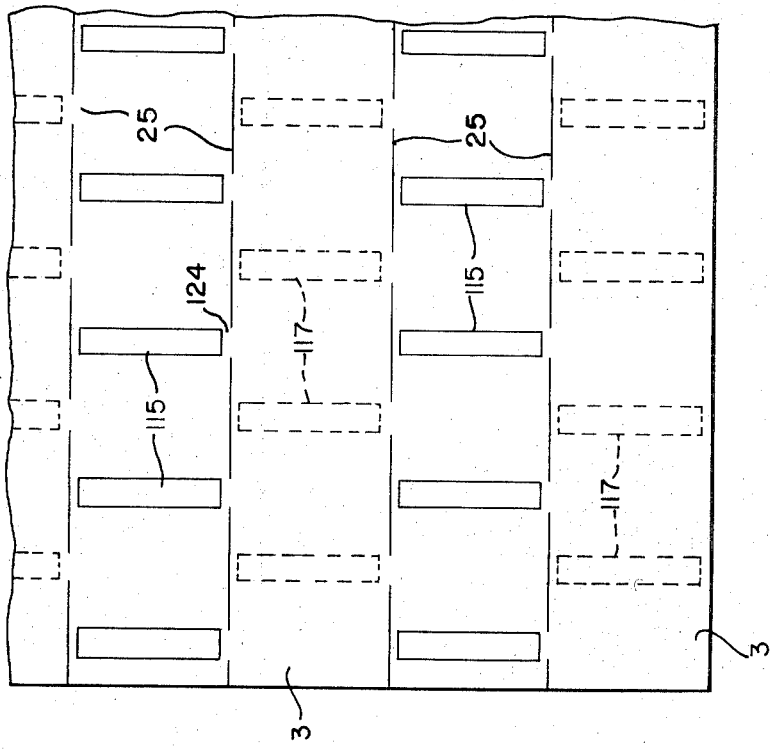
FIG. 17 is a fragmentary plan view illustrating the arrangement of slits and straight adhesive patches as applied to a slitted strip prior to folding to form (when folded) a product having cells extending perpendicularly to its faces.

FIG. 3 is an enlarged development of the surface of the backing roll 11, the surface being numbered 23. Examples of shapes and distribution of recesses are shown thereon. They may for example be placed in three groups or categories. A first category is indexed L; a second category, M; and a third category, N. The first category L is indicated by comparatively small circles arranged in eight ranks axially disposed around cylinder 11 at axial pitch distances designated ½Y. The recesses L in adjacent ranks in this category L are symmetrically offset thus peripherally forming symmetrically offset files of the recesses L around the cylinder 11. The distances between ranks are designated X. The ranks are bridged by the edges of the blades 19 of roll 9 when in tangent cutting position. Thus the blades will cut crosswise ranks of slits in the strip S between recesses but no cutting action occurs across the recesses. FIG. 17 illustrates the resulting ranks of slits 25 in strip 3. They are symmetrically staggered in adjacent ranks.

Figure 18:
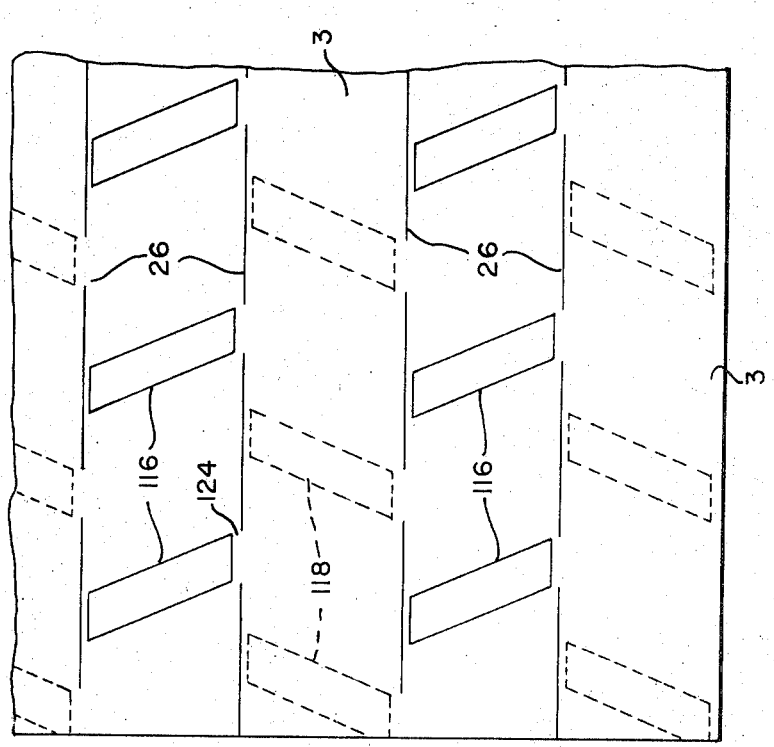
FIG. 18 is a fragmentary plan view like FIG. 17 but illustrating the arrangement of slits and angular adhesive patches as applied to a slitted strip prior to folding to form (when folded) a product having cells extending angularly with respect to its faces.

Returning to FIG. 3, the recesses in category M are likewise arranged in rows which are also spaced apart a peripheral distance X. These recesses instead of being circular have a long axis and are spaced apart along their rows a pitch distance Y, which for example is double that of ½Y. Again recesses M in adjacent ranks in category M are staggered with respect to those in an adjacent row. However the staggering is not symmetrical as in the case of recesses L. The recesses M have been stippled for convenient cognizance of this fact. The peripheral files of the recesses in category M form unsymmetrically offset files of recesses around the cylinder 11 with resulting slits 26 in strip 3 as shown in FIG. 18. These are unsymmetrically staggered in adjacent ranks.

The recesses in category N are also located in ranks which are spaced apart the distance X, the recesses in adjacent rows being symmetrically staggered. The pitch distances are again Y. The elongated recesses in category N have not been stippled to distinguish them from the elongated recesses in category M which are stippled. The peripheral files of the recesses in category N again form symmetrically offset files of recesses around the cylinder 11.

Figure 5:
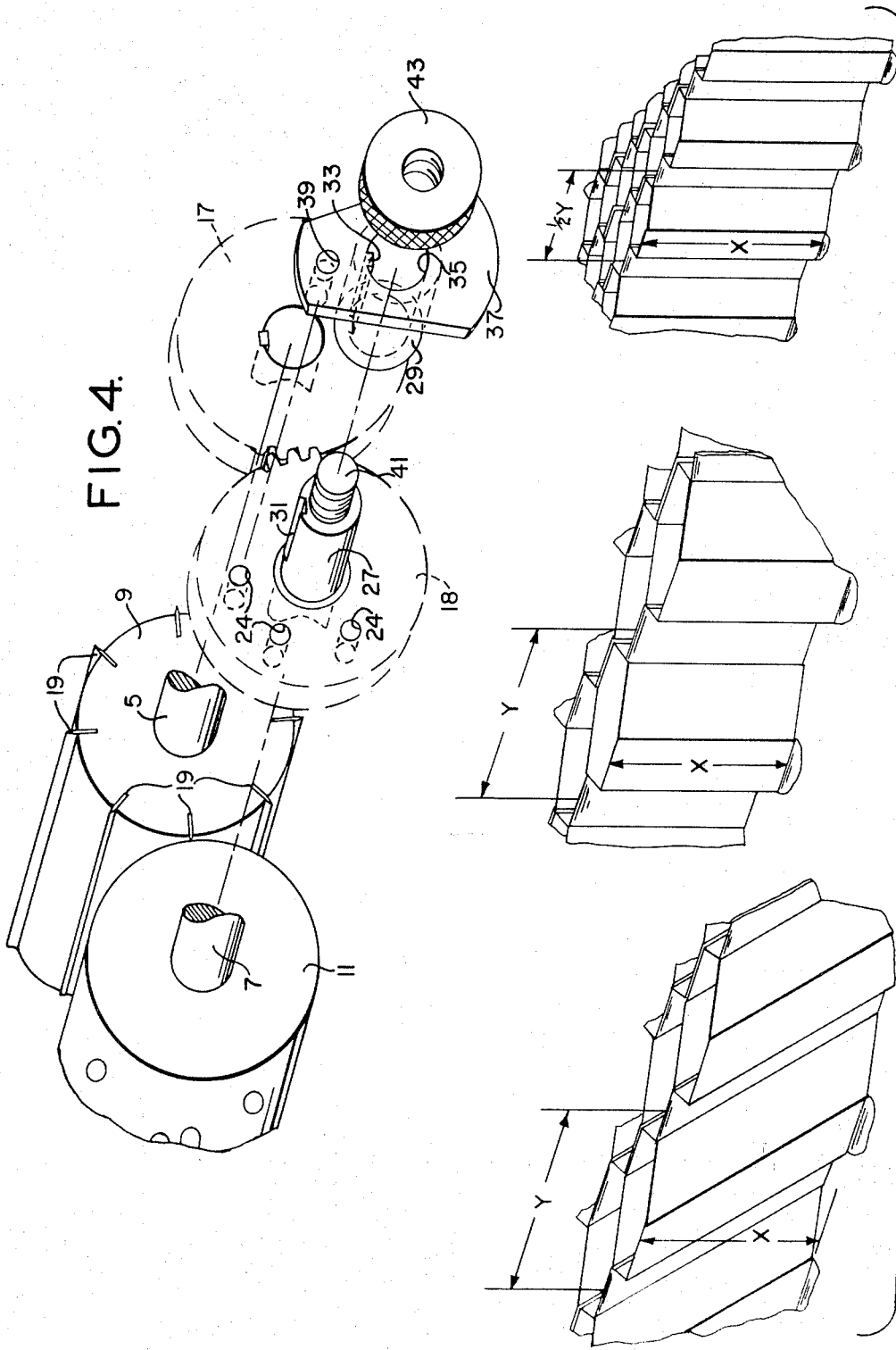
FIG. 5 illustrates various partially stretched cellular forms that may be produced by changing the phase angle between the cutting and backing rolls.

It may be mentioned at this time that the small symmetrical recesses in category L, having the pitch distances of ½Y, produce in the final product a comparatively fine orthogonal honeycomb product of depth X as shown at the right in FIG. 5. The longer symmetrically arranged recesses in category N at the greater pitch Y produce a coarser orthogonal honeycomb product of depth X as shown at the center in FIG. 5.

The longer recesses in category M which are unsymmetrically arranged also produce a coarse honeycomb of depth X in the finished product but in this case the axes of the honeycombs produced are angularly disposed between the opposite faces of the product as shown at the left in FIG. 5.

The gears 17 and 18 determine the phasing of the slitting and backing rolls 9 and 11, so that adjacent pairs of blades will successively engage with ranks of recesses of one or another of the categories L, M, N. To make a selection the phase angle between rolls 9 and 11 is changed. This is easily accomplished by means shown in FIGS. 1, 2 and 4. Thus while gear 17 is keyed to shaft 5, gear 18 is made rotatable on the shaft 7. Beyond the gear 18 the shaft 7 is reduced in diameter as shown at 27 for the axial sliding reception of a hub 29. The reduced portion 27 is provided with a key way 31 for the reception of a spline 33 in the hole 35 of the hub to key them together when assembled. Attached to the hub 29 is a plate 37 from which extends a pin 39. When the hub 29 is slipped over the reduced portion 27 and the pin 39 placed in one or another of properly spaced holes 24 in gear 18, then the gear 18 in effect becomes keyed in respect to the backing roll 11. A threaded extension 41 from shaft 7 receives a nut 43 which holds the hub 29 and plate 37 in position on the reduced portion 27.

To make a change in the phase angle between the rolls 9 and 11, the nut 43 is removed along wtih the hub 29 and plate 37. This retracts the pin 39 from the hole 24 in which it happens to be. Then either roll 9 or 11 may be turned independently of the other to rephase them for operation of blades 19 on the ranks of recesses in any desired category L, M or N on roll 11. Then the plate 37 is replaced with pin 39 in the appropriately presented hole 24 and the nut 43 replaced.

As the slitted strip 3 descends from the slitting section S, it passes into the adhesive-applying section A. The arrangements in this section A are illustrated in FIGS. 6–13.

There are two identical adhesive applying rolls in section A (FIG. 6) which apply adhesive in spaced patches on opposite sides of the strip 3. Since both rolls are identical, the description of one will suffice for both. Referring to FIG. 7 numeral 45 indicates a hollow manifold extending from a hollow inlet block 47 having an inlet fitting 49 for the reception of adhesive. Since there are two rolls, there will be two inlet fittings 49 (FIG. 1). The fittings 49 are designed to receive couplers 51 on the ends of resilient inlet lines 53 for delivery of adhesive under pressure. The lines 53 are branched from a common trunk line 55 connecting with adhesive supply 57 in a pressure tank 59. Air under pressure in line 61 drives the adhesive from the tank 59 to the trunk line 55. It is desired however that the flow of adhesive be metered. This is accomplished by the use of what is usually referred to as a peristaltic pump, numbered 63. It is driven from a motor 65 through a gear reducer 61. The pump has revolving rollers 67 which roll upon and squeeze shut the lines 53 which are made of flexible tubing. Thus between each pair of rollers a certain amount of adhesive is trapped under pressure and advanced to the manifolds 45. Thus the pump 63 constitutes a metering device for the pressurized adhesive.

Each hollow manifold 45 has centrally disposed outlets 69 (FIGS. 7 and 8) leading out into a central peripheral vein 71 cut into its outer surface. Branch veins 73 lead from vein 71 to vein terminals 75. The veins 71, 73, 75 may be milled into the outside surface of the manifold. This surface is developed at 77 in FIG. 8. The arrangement is such that the distance and pressure drop (due to friction) that the adhesive is required to flow through from the interior of the manifold 45 to any terminal will be the same. Thus each vein terminal 75 will receive adhesive at the same rate under pulsation from the metering device 63.

Referring to FIG. 9 there is shown at numeral 79 a closely fitting sleeve which is forced over the manifold 45 with an air-tight fit. This sleeve 79 has outlet ports 81 which register with the vein terminals 75. The inside of sleeve 79 serves to complete the veins 71, 73, 75 as tubular channels supplying adhesive to the outlet ports 81 on the outside of the sleeve.

Figure 6:
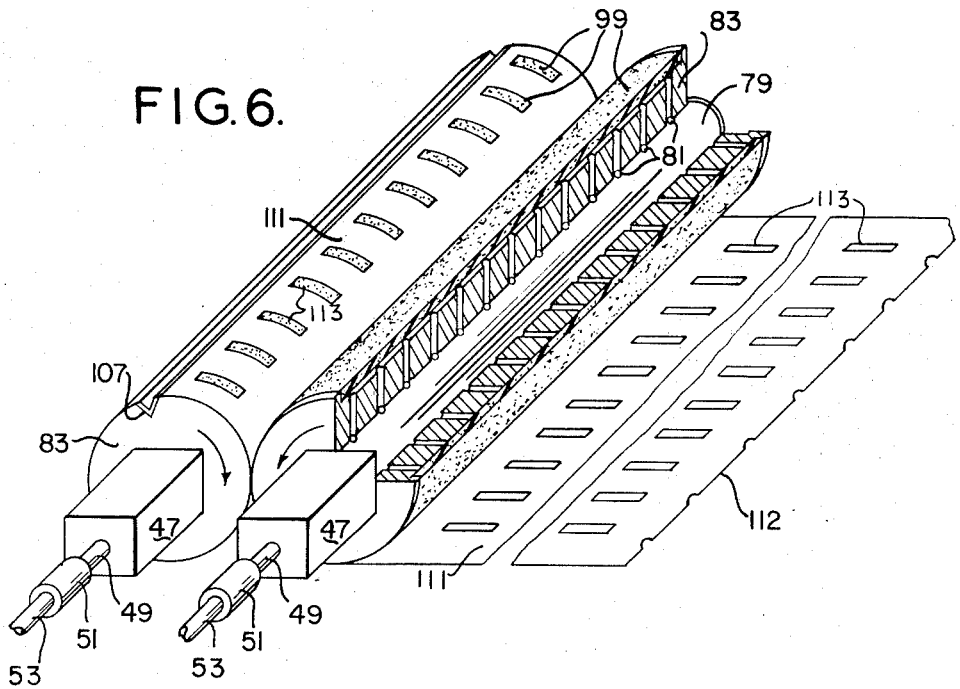
FIG. 6 is a view illustrating a pair of identical adhesive applicator roll assemblies of an adhesive application section of the apparatus, one of the roll assemblies being opened to show interior parts.
Figure 7:
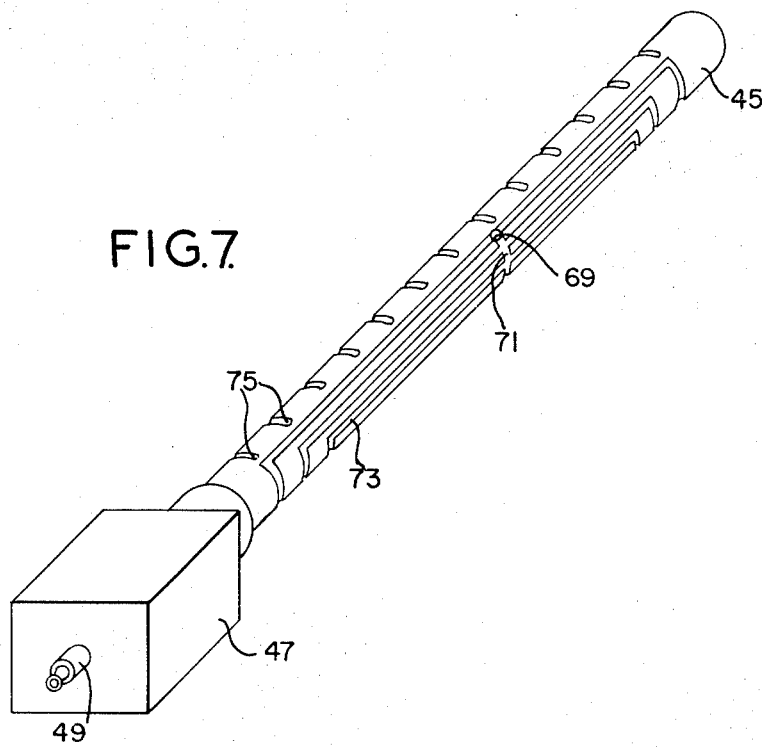
FIG. 7 is a view illustrating a veined manifold for adhesive distribution.

The outside of the sleeve 79 forms a bearing for a rotatable adhesive imprinting cylinder 83 shown more in detail in FIGS. 10–12 and in general in FIG. 6. Its cylindrical interior 85 fits around and is rotatable on the stationary sleeve 79 of the manifold 45. The sleeve is composed of an antifriction material such as Teflon.

Figure 13:
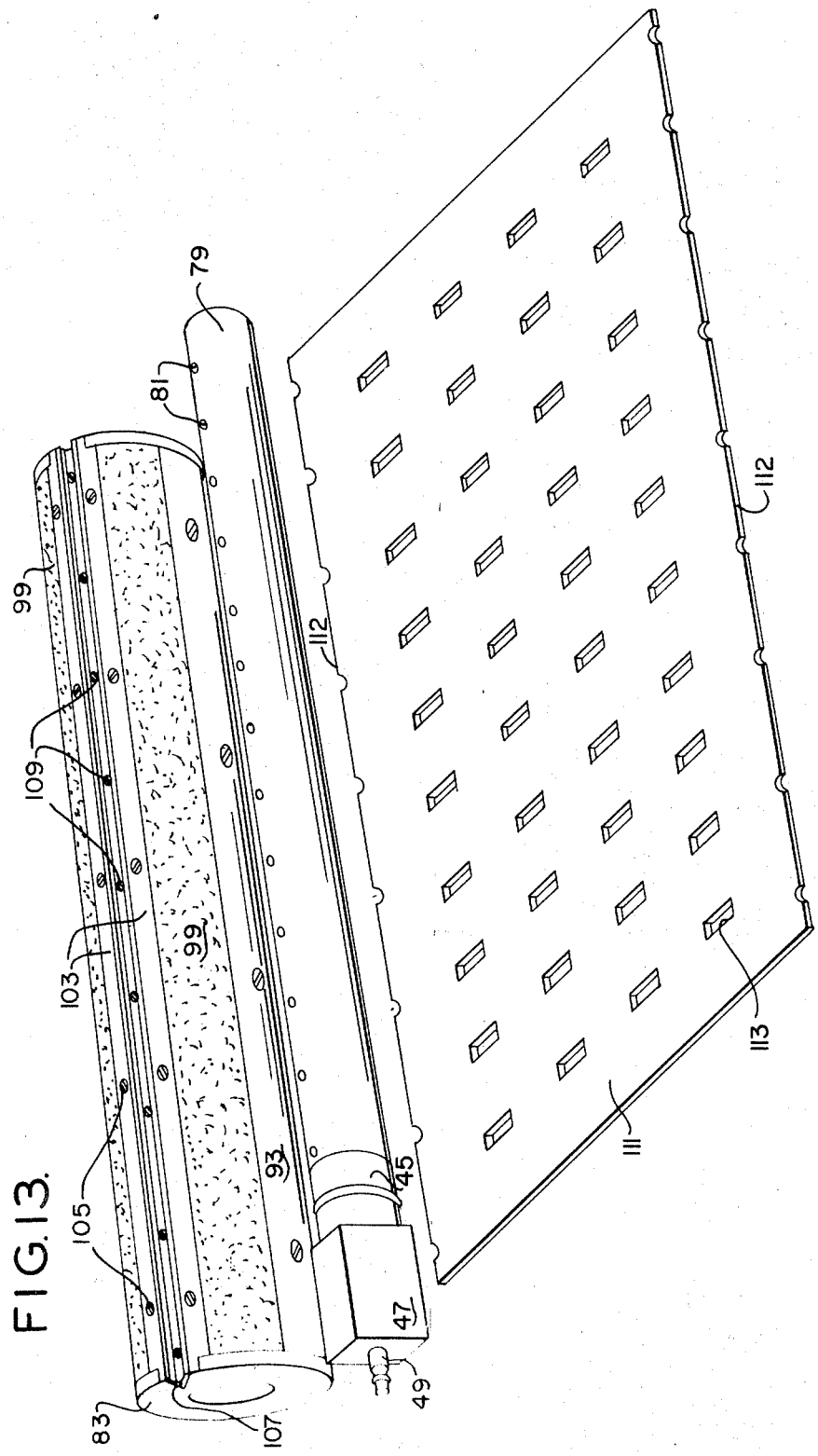
FIG. 13 is an illustrative layout of various adhesive delivery parts.

Each cylinder 83 has an octagonal exterior shape providing four flats 87 from which extend ribs 89 having circular exterior edges. Three of the other four flats 91 have clamping bars 93 held thereon by screws 95. The margins of these bars 93 are tongued and grooved as shown at 97 for clamping the margins of elongate strips 99. Thus the strips 99 are held in arched positions over spaces 101 between the ribs 89. FIGS. 11 and 13 show the strips 99 in place. FIG. 10 shows one strip 99 removed to expose the ribs 89 and spaces 101 therebetween.

The strips 99 are composed of suitable porous material through which the adhesive used may bleed. Appropriate materials are cellular foam plastic, felt or the like. On the fourth flat 91 the margins of the adjacent strips 99 are held down by tongues 84 of a pair of spaced bars 103 held in place by screws 105. These bars 103 are also beveled to receive between them a V-shaped metal strip 107 drawn into place by screws 109. Strip 107 holds in place a circumferential jacket or wrapper 111. The wrapper 111 is replaceable and is composed of an impervious material such as plastic impregnated fiberglass. Its margins 112 are held in place by the V-shaped bar 107.

Adhesive is supplied to the spaces 101 between ribs 89 and under the pervious strips 99. This is accomplished through four sets of passages 114 which lead from the inside surface 85 of rotary cylinder 83. These passages 114 extend radially to the slots 101 between the ribs 89. As the cylinder 83 rotates on the sleeve 79 of the manifold 45 the inlets to the passages 114 register successively with the vertical outlet ports 81 in said sleeve 79. Thus the strips are intermittently supplied with adhesive as they pass over the vertical position. The vertical outlet ports 81 are thus oriented to prevent adhesive flow during shut down.

In order to permit escape of the intermittently supplied adhesive from the strips 99 in accordance with a desired pattern, the wrapper 111 is provided with suitable ranks of ports 113 over the strips 99 as shown in FIGS. 1, 6 and 13, for example. The arrangement is such that as two of the cylinders 83 rotate tangently with the strip 3 therebetween and as passages 114 register with ports 81 there will be successively impressed on one side of the slitted strip 3 ranked areas 115 of adhesive (FIG. 17). Likewise there will be imprinted on the other side of the strip ranks of adhesive 117. The ranked patches 115 and 117 on opposite sides of strip 3 are staggered. All patches start at the punction 124 between slits 25 in one rank and extend upwardly to the slit 25 in the next rank. The extensions of all patches terminate near the center of the slit 25 in the next rank.

To apply patches of adhesive for use with the unsymmetrical slits 26 of category M, the ports in wrapper 111 are angled to apply front and back angled patches of adhesive to the strip 3 as shown at 116 and 118 in FIG. 18. This requires only the substitution of wrappers such as 111 on the two cylinders 83, containing properly angled ports. Thus the adhesive is protected from access thereto by air until it exudes from the mat strips 99 through the ports in the selected wrapper and onto the strip 3.

In order to drive the pair of cylinders 83 tangently on opposite sides of the strip 3 each is provided with a coupling means such as shown at 86 in FIG. 10. One of these couplings is driven from a power shaft 88 and the other from a shaft 90, the shafts 88 and 90 being connected through meshed gears 92.

Figure 14:
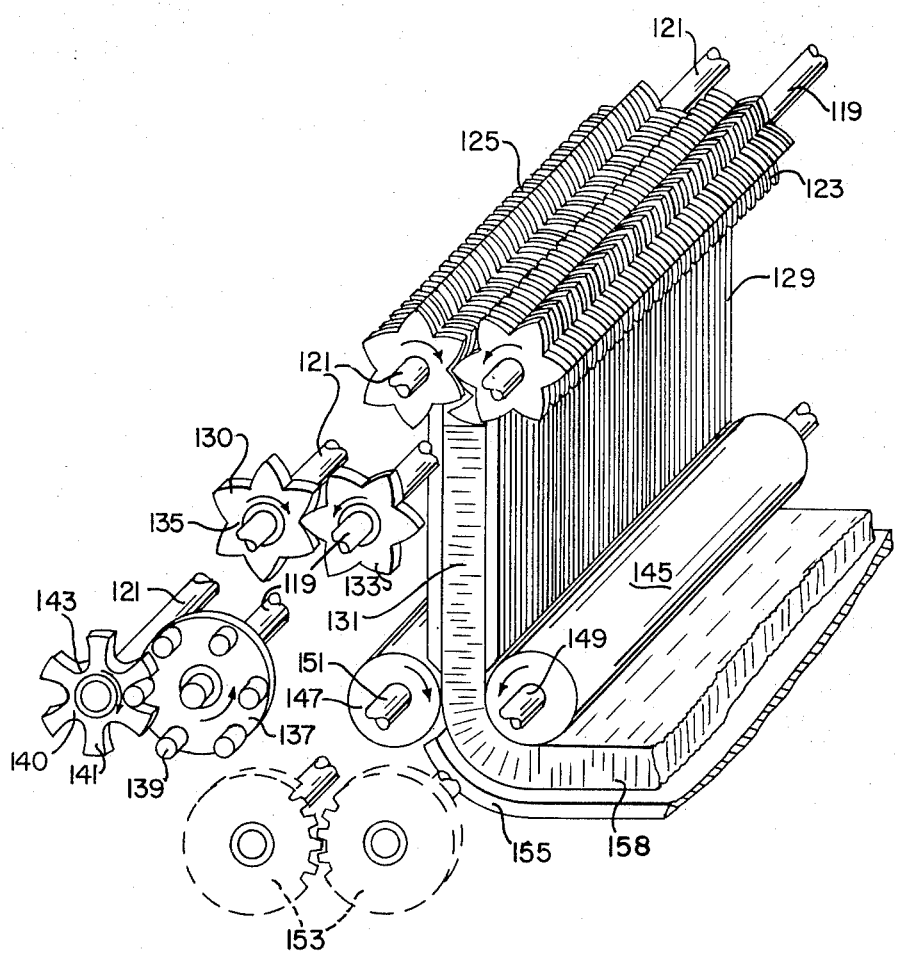
FIG. 14 is a general diagrammatic view showing certain folding apparatus.
Figure 15:
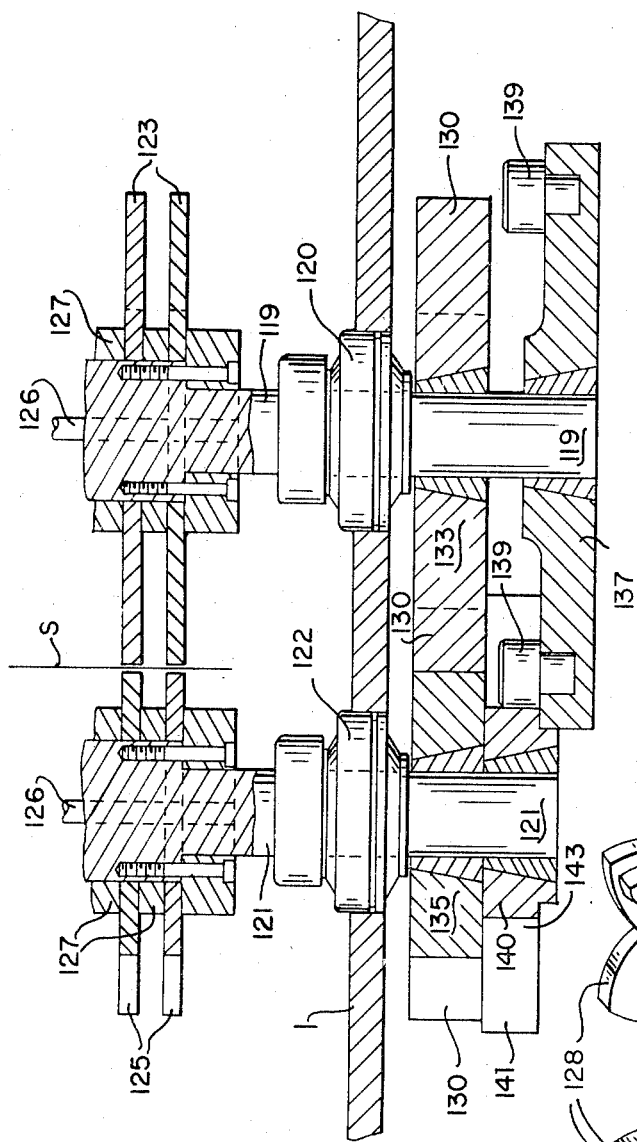
FIG. 15 is a horizontal section through parts of the folding apparatus.
Figure 16:
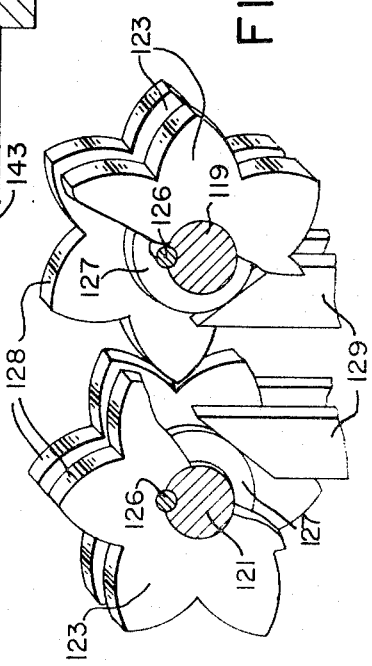
FIG. 16 is a detail view of stripping guide means.

The strip 3 with the adhesive thus applied descends from the adhesive applying Section A to the folding and pleating section P. As shown in FIGS. 14–16, in the pleating or folding section P are located shafts 119 and 121 mounted on bearings 120, 122. On the shafts are gangs of star wheels 123 and 125 respectively held by keys 126. These wheels form a folding pleater. The lobes 128 of these wheels interdigitate with ample clearance between the lobes to accept various thickness of strip 3, as best shown in FIG. 16. Each star wheel is spaced from the next adjacent one by means of a washer 127. Between adjacent wheels are stripping and guide blades 129 (FIG. 16). As illustrated in FIG. 14, as the strip 3 passes between the gangs of star wheels it is folded into an accordian pleated band 131 which descends between the stripper and guide blades 129. The shafts 119 and 121 also carry an additional pair of similar star wheels 133 and 135 respectively having lobes 130 which intermesh without any substantial clearance at their cusped ends. Wheel 133 drives wheel 135 during part of their revolutions. This driving action has just been completed in FIG. 14. The next lobe 130 of wheel 133 is however not in a position to drive the next lobe 130 on wheel 135. This is because the lobe forms for folding are not consistent with such action being designed to bring about best folding action by the lobes 128 on the folding wheels 123 and 125. In order to obtain a drive during the next period of movement the shaft 119 is provided with a disk 137 on which are pin mounted rollers 139. These drive the spokes 141 of a spider 140 having notches 143 into which the rollers travel. The spider is keyed on shaft 121. At the stage shown in FIG. 14 a roller 139 is about to come into driving action with one of the spokes 141 of the spider. Now the drive between shafts 119 and 121 rather than occurring as it did through the lobes of wheels 133 and 135 occurs between a pin 139 on disk 137 and a spoke 141 of the spider. The shapes of the lobes on star wheels 133 and 135, and the shapes of the notches 143 are such that optimum conditions of advance of the strip 3 through the star wheels 123 and 125 is obtained without requiring the star wheels 123, 125 which fold the strip 3 to effect any driving through it. Stated otherwise, a constant clearance is maintained between the intermeshing lobes of the star wheels 123 and 125. The alternating drive from shaft 119 to shaft 121, first through the star wheel 133 to 135 and then through the disk 137 to spider 140 allows the shapes of the teeth on wheels 133, 135 to be shaped without regard to ordinary gear tooth driving requirements, but to provide for optimum nontouching folding actions between wheels 123 and 125.

Below wheels 123, 125, the folded strip takes a pleated form as a band 131, the adhesive between folds forming attachments between them. The band 131 descends between the blades 129 and around guide rollers 145 and 147 on shafts 149 and 151, respectively. These are rotatably timed by a set of gears 153. A plate 155 guides the descending band 131 around roller 145. Thus the path of the band 131 then becomes horizontal.

To the right of roller 145 (FIG. 1) is a pivoted bar 157 of substantial weight which acts as a friction brake bar decelerating the band 131 in its movement to the right. The result is an area of compaction indicated by numeral 158 wherein setting of the adhesive is completed. The compaction gradually pushes past the brake.

Coordinately timed drive means for the apparatus is as follows:

Shaft 5 is driven from the speed reduction and motor unit 13, 15. Shaft 88 is driven from shaft 5 by a chain or like drive 159. Shaft 90 is driven from shaft 88 by the gears 92. Shaft 119 is driven by a chain or like drive 161 from shaft 88. Shaft 121 is driven from shaft 119 partly by star wheels 133, 135 and partly by plate 137 and spider 140. Shaft 149 is driven from shaft 119 by a chain or like drive 163. Shaft 151 is driven from shaft 149 by gears 153. Thus all of the rotations of the operating elements in the sections S, A, P and T are cyclically timed.

It will be understood that if desired the band 131 as compacted at 158 may be delivered from the brake section B as an intermediate product to be stretched elsewhere into honeycomb form. On the other hand, it may be stretched as it comes from section B. In this case the stretching arrangement forms the stretching and finishing section F (FIG. 1). This includes a pair of friction draw rolls 165, 167 carried on shafts 166, 168 which are geared by means of a set of gears 169. The roll 167 is driven from a motor 171 through a gear reduction drive 173. The action of the rolls 165 and 167 in accelerating and drawing the compaction 158 to the right stretches it to open up the honeycomb cells. At the same time the stretched compaction or band at 160 becomes constricted at its sides and narrower. The faster that the rolls 165, 167 turn, the narrower the stretched band 160 becomes. It is desirable that its narrowed width shall remain substanially constant. To accomplish this there is provided a fixed shoe 175 on one side of the band 131 and a movable width sensing shoe 177 on its opposite side. Shoe 177 carries a stem 179 extending into an electrical width sensing unit 181 which includes a resilient element such as a spring (not shown) biasing shoe 177 into engagement with the band 131. Width sensing means 181 is conventional, e.g., a rheostat or the like and electrical circuitry for converting movements of shaft 179 into signals operative in the conventional motor circuit (not shown) to slow down or accelerate the motor. If the speed of the rollers 165, 167 is too rapid with excessive stretching and narrowing of the band, the shoe 177 will respond by movement toward fixed shoe 175. The resulting signal in the unit 181 causes the motor 171 to slow down, thus terminating any incipient narrowing of the band. Conversely, if the speed of the rolls 165, 167 is too slow then its width will incipiently increase. This causes the shoe 177 to move outwardly, forcing stem 179 to produce a signal in the circuitry of 181 to increase the speed of the motor 171. Thus any incipient increase in the width of the issuing band is terminated.

General operation of the aparatus is as follows, referring to FIG. 1:

The roll phasing between rolls 9 and 11 is set. The strip 3 is drawn down between the slitting and backing rolls 11. The roll setting is such that the blades 19 strike against the backing roll 11 across ranks of whatever group of recesses L, M or N is desired to effect slitting. If they strike across the ranks of the small, closely spaced recesses in the symmetrically disposed category L, then the fine orthogonal honeycomb structure such as shown at the right in FIG. 5 will be produced. If they strike across the more widely spaced and wider recesses in the ranks in symmetrically disposed category N, then coarser orthogonal honeycomb structures such as shown in the middle of FIG. 5 will be produced. If they strike across ranks of the widely spaced wider unsymmetrically recesses in category M, then a sloping honyecomb structure will be produced such as shown at the left in FIG. 5. The adjustment in the phase angle of operation of the rolls 9 and 11 is easily performed by resetting the position of the pin 39 in one or another of the holes 24 in the disk 18.

After slitting, the strip 3 descends into the adhesive section A. The sets of passage 114 of the cylinders 83 register one after another with the outlet ports 81 in the sleeve 79 on the manifold 45, thus intermittently supplying adhesive through the porous strips 99 and the ports 113. Depending upon which type of wrapper 111 is on the cylinders with straight or slopping ports, adhesive patches are applied as in FIG. 17 or FIG. 18.

Then the slitted strip 3 with adhesive applied either as in FIG. 17 or FIG. 18 moves down through the pleating section P to be folded into the band 131. The band descends between blades 129 and then moves horizontally to form the compaction 158 in the braking section B where it is decelerated. From the braking section it is drawn out at increased speed which stretches and narrows it. The width is kept substantially constant as it leaves the finishing section F. Upon leaving the finishing section it is provided in the usual manner with suitably adhered means such as skins of paper, cardboard or the like (not shown) on the upper and lower faces to maintain the open cellular form. Or if the material of the constituent strip 3 has been selected to be conventionally set by baking, such a baking step may succeed the stretching step instead of application of skins.

Figure 20:
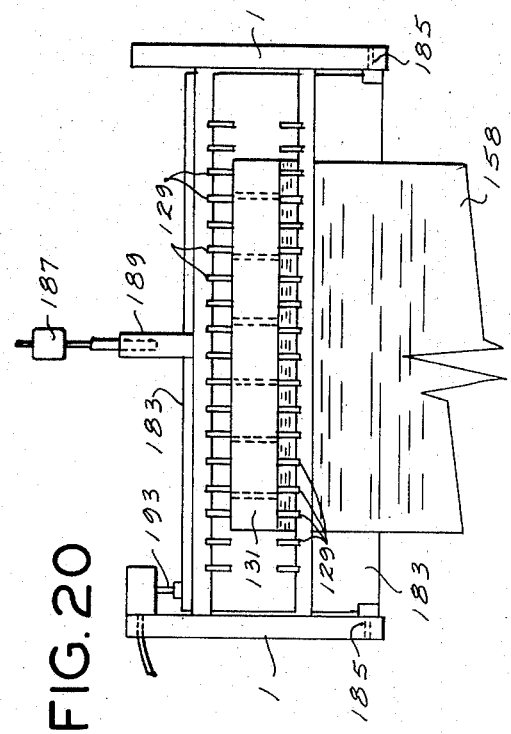
FIG. 20 is a horizontal section taken on line 20—20 of FIG. 19.
Figure 19:
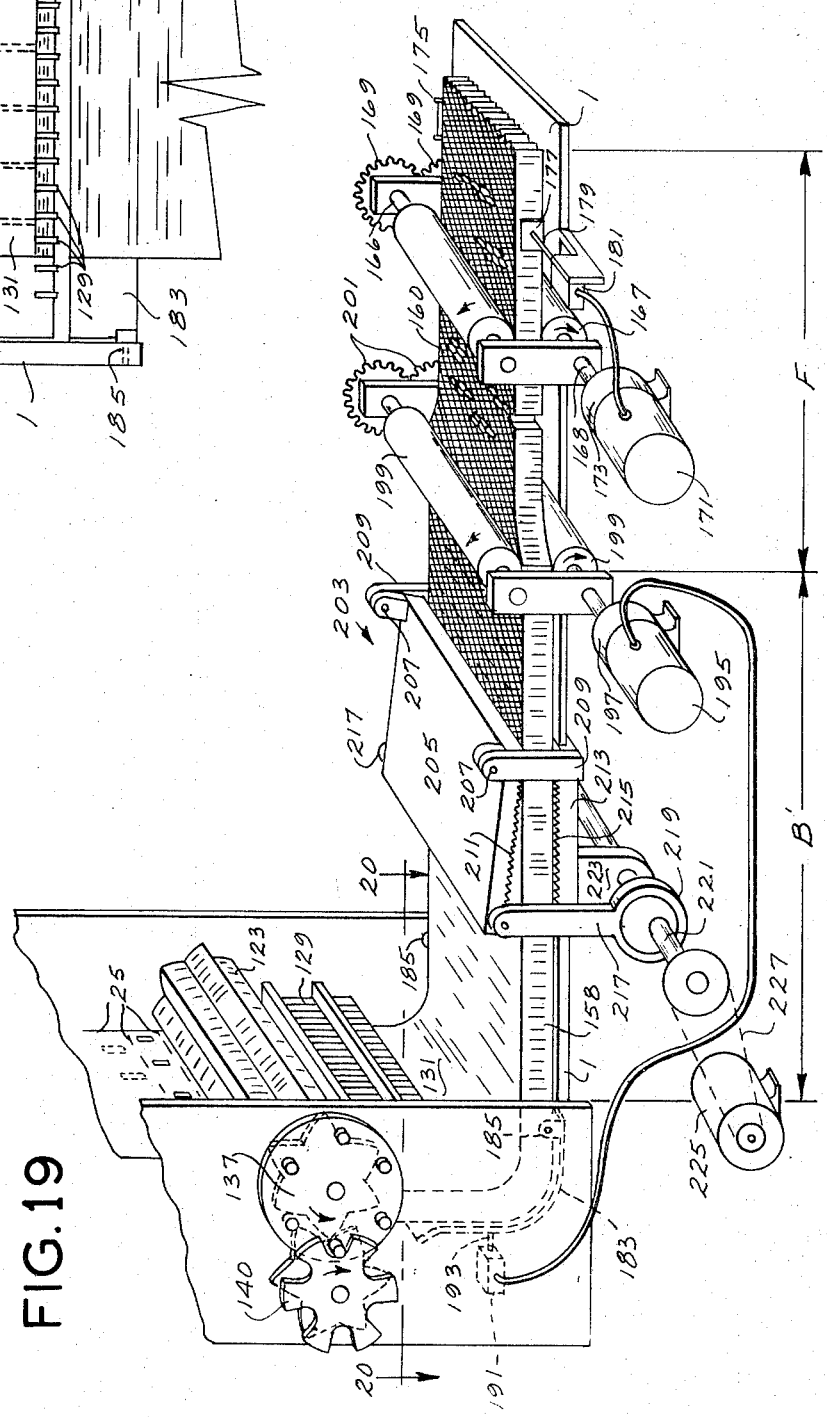
FIG. 19 is a fragmentary view illustrating certain modifications forming the continuing features of the invention.

FIGS. 19 and 20 illustrate a form of the invention in which the braking section B is modified and lettered B'. In this form, the rolls 145 and 147 are omitted as is also the fixed guide plate 155. Instead of the latter, a pivoted curved deflection plate 183 is employed. Its pivots on the frame 1 are shown at 185. The plate 183 is centrally counterweighted by an arm 189. A weight 187 is adjustably threaded on the arm 189 (see FIG. 20). The stronger the downward compacting force in the descending vertical reach 131, the more plate 183 will be forced anticlockwise. At 191 is an electrical sensing unit which includes a stem 193 engageable by the upright face of the plate 183. The sensing unit 191 is conventional, e.g., a rheostat or the like in electrical circuitry for converting movements of the spring-returned stem 193 into signals operative in a control circuit (not shown) for a motor 195. The motor 195 speed is increased as the stem 193, by counterclockwise action of plate 183, is pressed in against its internal return spring (not shown), being located in the sensing unit 191. The motor speed is decreased if and when the stem 193 is allowed to spring-return, turning plate 183 clockwise.

The motor 195, through a gear reduction unit 197, turns the lower one of a pair of variable-speed braking rolls 199. These rolls are geared at a 1:1 ratio by gears 201. They turn in the directions shown by the darts thereon and are spaced so as to nip and positively contact the top and bottom of the horizontal course of the compaction 158. Their line contacts are not of a free-rolling nature, and therefore in the nip space between them they have a restraining effect. Their variable surface speeds at contact are in general less than the speed of advance of the compacted band 158. The turning speeds of rolls 199 depend upon the speed of the motor 195, which in turn depends upon the position of the plate 183. When these are selectively coordinated by the proper positioning of the counterweight 187 and rod 193, a selected degree of compaction 158 may be ideally maintained in its horizontal course to the rolls. Here it has closed cells. Deviations from the ideal compaction are corrected at their incipiency.

Thus, if compaction tends to increase due to too fast a feed-down of folded material from the star wheels 123, 125, the shoe 183 will be pushed too far counterclockwise, with the result that the braking rolls 199 speed up to reduce their braking effect and relieve the excess pressure of compaction. If on the other hand plate 183 swings too far clockwise under the relieved compaction, the rolls 199 slow down, thereby increasing their braking effect again to build up the degree of compaction. In this way, a more uniform compaction pressure is maintained than with the brake bar 157 of FIG. 1 which, while substantially satisfactory, has the tendency unevenly to collect and pile up adhesive on its flat bottom, thereby effecting more variable braking and compaction and must be more often cleaned than the controlled brake rollers 199. The latter, having line braking contact, do not do this to any great extent and, while they require some cleaning from time to time, it is much less frequent and constancy of compaction is more evenly maintained with a resulting more perfect end product with less down time of the apparatus as a whole for purposes of cleaning.

Another feature of the modification of FIGS. 19 and 20 is in the provision of a stomping or surfacing device shown at 203. This comprises a rocker plate 205 pivoted at 207 on posts 209 connected to the framework 1. Plate 205 is toothed, knurled or otherwise roughened on its flat bottom surface as shown at 211. The posts also support a fixed bottom plate 213 also toothed, knurled or otherwise roughened on its upper flat surface as shown at 215. The reach 158 of compacted material passes between the plates 205 and 213. The forward edge of rocker plate 205 is pivoted to a pair of arms 217 terminating downwardly in eccentrics, one of which is shown at 219. The eccentrics 219 are carried on and driven by a cross shaft 221 carried by suitable supports from plate 213. One such support is shown at 223.

The shaft 221 is driven by a motor 225 via a drive 227. Thus the stomping plate is oscillated from an angular position as shown in FIG. 19 to a horizontal position parallel to the fixed lower plate 213. In the latter position the knurling or the like toothed areas lie parallel and gouge somewhat into the upper and lower surfaces of the closed-cell compaction 158 so as somewhat to break them down and evenly spread out any adhesive which finds its way to the surfaces. Thus, when the compaction 158 becomes expanded into a web as at 160 of open-cell form, there is provided an improved somewhat gouged and adhesive leveled surface on each of the top and bottom to which appropriate skins may be better adhered by gluing or the like in the usual manner. The number of strokes or impacts provided by the plate 205 is variable, but approximately five hundred per minute have been found to be satisfactory. The exact number depends upon the rate at which the compacted material moves in accordance with the speed setting of the entire machine.

Beyond the braking rollers 199 the compaction is stretched to completely open-cell web form as illustrated at the right of FIG. 19. Further description in this regard will be unnecessary, since it is the same as shown on FIG. 1, like numerals indicating like parts as described above.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:
1. Apparatus for stretching a compaction of honeycomb-forming material to form therefrom an expanded honeycomb web of substantially constant width, comprising:
   means for advancing the compaction at one rate;
   variable compensating drive means operative upon a portion of the compaction to stretch it at another and greater rate whereby the honeycomb web is formed by stretching and its width becomes narrower than the width of the compaction;
   width sensing means adjacent the margins of the narrowed web; and
   means controlling said drive means from said sensing means such that as the width of the stretched web incipiently decreases the rate of said drive is decreased and when its width incipiently increases the speed of said drive increases.

2. Apparatus according to claim 1, wherein said drive means includes at least one draw roll and a motor drive for said draw roll, said sensing means controlling the speed of the motor drive.

3. Apparatus according to claim 2 including a brake engaging the compaction at a region advancing toward the draw roll.

4. Apparatus according to claim 1 including relatively movable surfacing means above and below said compaction and formed for effecting deformations on the upper and lower surfaces of said compaction to prepare these surfaces for subsequent attachment of suitable skins or the like to the expanded web.

5. Apparatus according to claim 3, wherein the drive means includes two geared draw rolls and said brake comprises a bar biased downwardly against the top surface of said compaction to produce a drag thereon.

6. Apparatus according to claim 3, wherein said brake comprises a pair of geared variable-speed braking rolls.

7. Apparatus for controlling a compaction of slitted, folded and pleated strip material having spaced patches of adhesive between its pleats and issuing from a folding pleater to become initially a noncellular compaction adapted subsequently to become a cellular substantially honeycomb web when stretched, comprising:
a movable deflecting member for receiving the pleated material issuing from the pleater and deflecting it;
a brake for variably braking the deflected material to effect compaction; and
sensing means responsive to movements of said movable deflecting member for controlling the braking action of said brake in accordance with the position of said movable deflecting member whereby the degree of compaction is maintained substantially constant.

8. Apparatus according to claim 7, wherein said brake comprises variable-speed braking rollers engaging the compaction and responsive in speed to said sensing means to maintain the degree of compaction substantially constant; and which further includes means for stretching the compaction as it leaves said braking rollers to form therefrom an expanded honeycomb web of substantially constant width, said stretching means comprising spaced draw rolls engaging the upper and lower surfaces of the web of material issuing from said braking rollers, a variable-speed motor drive for driving said draw rolls whereby the desired honeycomb web is formed by stretching and its width becomes narrower than the width of the compaction, width sensing means adjacent the margins of the narrowed web in its stretched condition, means controlling said motor drive for the draw rolls and operative from said width sensing means such that as the width of the stretched web incipiently decreases the rate of said motor drive is decreased, and when its width incipiently increases the speed of said motor drive increases.

9. Apparatus according to claim 8, wherein said movable deflecting member is a plate pivoted for movement under gravity bias in a direction tending to deflect said material.

10. Apparatus according to claim 9, wherein said pivoted plate carries an adjustably positioned weight to vary the bias, whereby the degree of constant compaction may be changed.

11. Apparatus according to claim 10, including relatively movable surfacing means above and below the compaction and located between said plate and said braking rollers for deforming the upper and lower surfaces of the compaction to prepare these for subsequent attachment to the web material of suitable skins or the like.

12. Apparatus according to claim 11, wherein said surfacing means comprise pivoted plates above and below the compaction provided with projections which engage said compaction for breaking down the upper and lower flat surfaces thereof so as to improve the surfaces for subsequent attachment of suitable skins.

13. Apparatus according to claim 12, wherein the plate below the compaction is fixed, and which further includes eccentric drive means for oscillating the plate above the compaction to effect said relative movement.

References Cited

UNITED STATES PATENTS

| | | | |
|---|---|---|---|
| 2,822,028 | 2/1958 | Himmelheber et al. | 156—360 |
| 2,731,379 | 1/1956 | Wheeler | 156—197 |
| 3,035,952 | 5/1962 | Gwynne | 156—197 |
| 2,888,060 | 5/1959 | Kjell-berger | 156—360 |
| 3,220,906 | 11/1965 | Lincoln | 156—197 |

BENJAMIN A. BORCHELT, Primary Examiner

J. V. DORAMUS, Assistant Examiner

U.S. Cl. X.R.

156—197, 219, 477, 586